United States Patent
Peden et al.

(10) Patent No.: US 8,438,058 B2
(45) Date of Patent: *May 7, 2013

(54) INTERNET SERVICE SYSTEMS AND METHODS

(75) Inventors: Mark D. Peden, Olathe, KS (US); Terri A. Truesdale-Fraser, Olathe, KS (US); Randall R. Blair, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 291 days.

This patent is subject to a terminal disclaimer.

(21) Appl. No.: 12/847,297

(22) Filed: Jul. 30, 2010

(65) Prior Publication Data

US 2010/0293077 A1 Nov. 18, 2010

Related U.S. Application Data

(63) Continuation of application No. 10/307,865, filed on Dec. 2, 2002, now Pat. No. 7,797,190.

(51) Int. Cl.
*G06Q 30/00* (2012.01)

(52) U.S. Cl.
USPC ......... 705/14.19; 705/14.35; 705/35; 705/41; 705/51

(58) Field of Classification Search ............... 705/14.19, 705/14.35, 35, 41, 51
See application file for complete search history.

(56) References Cited

U.S. PATENT DOCUMENTS 6,842,782 B1 * 1/2005 Malik et al. ................. 709/224
7,797,190 B1 * 9/2010 Peden et al. ............... 705/14.19

* cited by examiner

*Primary Examiner* — Raquel Alvarez

(57) ABSTRACT

A method of operating an internet service system comprises receiving a service request, wherein the service request identifies a user and indicates a service requested by the user, selecting a first brand for display on a first section of a web page based on an identity of the user and the service requested by the user, selecting a second brand for display on a second section of the web page based on the identity of the user and the service requested by the user, generating the web page with the first brand and the second brand, and transferring the web page for display to the user with the first brand in the first section of the web page and the second brand in the second section of the web page.

5 Claims, 4 Drawing Sheets

INTERNET SERVICE SYSTEMS AND METHODS

RELATED APPLICATIONS

This application claims priority to and is a continuation of U.S. patent application Ser. No. 10/307,865, entitled PREPAID INTERNET SERVICE, filed on Dec. 2, 2002, and which is hereby incorporated by reference in its entirety.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to systems that provide Internet service on a prepaid basis.

2. Description of the Prior Art

Prepaid Internet services are available from various Internet Service Providers (ISPs). To obtain prepaid Internet service, a user transfers money to an ISP in exchange for a prepaid Internet account and user software for accessing the prepaid Internet service. Alternatively, a sponsor may pay for the prepaid Internet account and user software. The software is often provided on a compact disk or is downloaded from the Internet. The user then operates a computer having the software to access the ISP and obtain the Internet service. The ISP decrements the user prepaid Internet account based on the Internet service provided to the user. The prepaid Internet service usually comes with additional features, such as e-mail and prepaid account refresh. Typically, the ISP places their own business brand on the home page that is transferred to the user in response to an Internet service request.

In some cases, a business may want to offer a prepaid Internet service that has their own business brand. If the business does not want to incur the cost and complexity of building and operating their own prepaid ISP, then the business may choose to resell a prepaid Internet service that is provided by a prepaid ISP wholesaler. In other cases, a prepaid ISP may not have the marketing strength to effectively sell their prepaid Internet service, so the prepaid ISP may choose to wholesale their prepaid Internet service to resellers who effectively market the prepaid Internet service. In either case, the business reseller places their own business brand on the home page of the prepaid Internet service, and the prepaid ISP wholesaler does not obtain any brand equity. Unfortunately, the business reseller may pay more than they want to obtain brand equity with the prepaid Internet service users.

SUMMARY OF THE INVENTION

The invention helps solve the above problems with prepaid ISP technology. The technology allows independent business entities to co-brand a prepaid Internet service. Advantageously, both business entities obtain brand equity with users. Both business entities also obtain a powerful communication channel with their customers. An ISP can acquire brand equity while obtaining marketing assistance from a co-branding reseller. A co-branding reseller may lower their costs to the prepaid ISP by allowing the ISP to acquire brand equity.

Examples of the invention include ISP systems, methods of ISP system operation, and software products for ISP systems. The software products include software that directs ISP system operation and a storage system that stores the software.

Some examples of the invention include an ISP system comprising a communication system interface, an Internet interface, and a server system coupled to the communication system interface and the Internet interface. The communication system interface is coupled to a communication system. The Internet interface is coupled to an Internet. The server system is configured to store a plurality of user identifiers in individual association with a plurality of independent business brands. The server system is configured to receive a first Internet service request including a first one of the user identifiers from a first user of the communication system. The server system is configured to process the first user identifier to select a first one and a second one of the independent business brands from the plurality of the independent business brands. The server system is configured to transfer a first page to the first user including the first independent business brand and the second independent business brand. The server system is configured to provide Internet service to the first user in response to a first user input to the first page. The server system is configured to decrement a first user prepaid account in response to the Internet service provided to the first user.

In some examples of the invention, the server system is configured to receive a second Internet service request including a second one of the user identifiers from a second user of the communication system. The server system is configured to process the second user identifier to select the first one and a third one of the independent business brands from the plurality of the independent business brands. The server system is configured to transfer a second page to the second user including the first independent business brand and the third independent business brand. The server system is configured to provide the Internet service to the second user in response to a second user input to the second page. The server system is configured to decrement a second user prepaid account in response to the Internet service provided to the second user.

In some examples of the invention, the first page and the second page have the same Universal Resource Locator.

In some examples of the invention, the first page is comprised of a left section, a center section, a right section, and a header section. The server system is configured to store the user identifiers in individual association with a plurality of left section displays, a plurality of center section displays, a plurality of right section displays, and a plurality of header section displays. The server system is configured to process the first user identifier to select: one of the left section displays from the plurality of the left section displays, one of the center section displays from the plurality of the center section displays, one of the right section displays from the plurality of the right section displays, and one of the header section displays from the plurality of the header section displays. The server system is configured to include the selected left section display in the left section of the first page, include the selected center section display in the center section of the first page, include the selected right section display in the right section of the first page, and include the selected header section display in the header section of the first page.

In some examples of the invention, the server system includes a staging system. The staging system is configured to receive at least one of the selected displays over the Internet from a second business entity having the second independent business brand and store the at least one selected display in association with the first user identifier. In some examples of the invention, the staging system is configured to allow a first business entity having the first independent business brand to review and approve the at least one selected display from the second business entity before using the at least one selected display for the first page.

In some examples of the invention, there are a plurality of access telephone numbers for accessing the ISP system over the communication system and there are a plurality of service rates. The server system is configured to select one of the service rates based on the one of the access telephone numbers used by the first user. The server system is configured to use the selected service rate to decrement the first user prepaid account in response to the Internet service provided to the first user.

In some examples of the invention, there are a plurality of service rates. The server system is configured to process the first user identifier to select one of the service rates from the plurality of the service rates. The server system is configured to use the selected service rate to decrement the first user prepaid account in response to the Internet service provided to the first user.

In some examples of the invention, there are a plurality of access telephone numbers for accessing the ISP system over the communication system. The server system is configured to select and include information in the first page based on the one of the access telephone numbers used by the first user. In some examples of the invention, a business entity having the second independent business brand has a local promotion in a local geographic area associated with the one access telephone number used by the first user. The information that is selected and included in the first page comprises local promotion information. In some examples of the invention, there is a local geographic area associated with the one access telephone number used by the first user. The information selected and included in the first page comprises local geographic area information related to at least one of: local weather, local sports, local news, and local entertainment.

In some examples of the invention, the server system is configured to restrict the Internet service provided to the first user to web sites selected by a business entity having the second independent business brand.

In some examples of the invention, the server system is configured to provide access to a specific website to only a subset of the user identifiers.

In some examples of the invention, the server system is configured to provide a specific enhanced service to only a subset of the user identifiers.

In some examples of the invention, the server system is configured to generate a report specific to ones of the user identifiers associated with the second independent business brand. The reports may indicate refresh activity by the ones of the user identifiers associated with the second independent business brand. The reports may indicate access telephone numbers used by the ones of the user identifiers associated with the second independent business brand. The reports may indicate Internet service time used by the ones of the user identifiers associated with the second independent business brand. The reports may indicate user inputs to the first page by the ones of the user identifiers associated with the second independent business brand. The reports may indicate e-mail addresses for the ones of the user identifiers associated with the second independent business brand.

In some examples of the invention, the server system is configured to transfer additional pages to the first user including the first independent business brand and the second independent business brand.

BRIEF DESCRIPTION OF THE DRAWINGS

The same reference number represents the same element on all drawings.

DETAILED DESCRIPTION OF THE PREFERRED EMBODIMENT

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

ISP System Configuration and Operation

Figure 1:
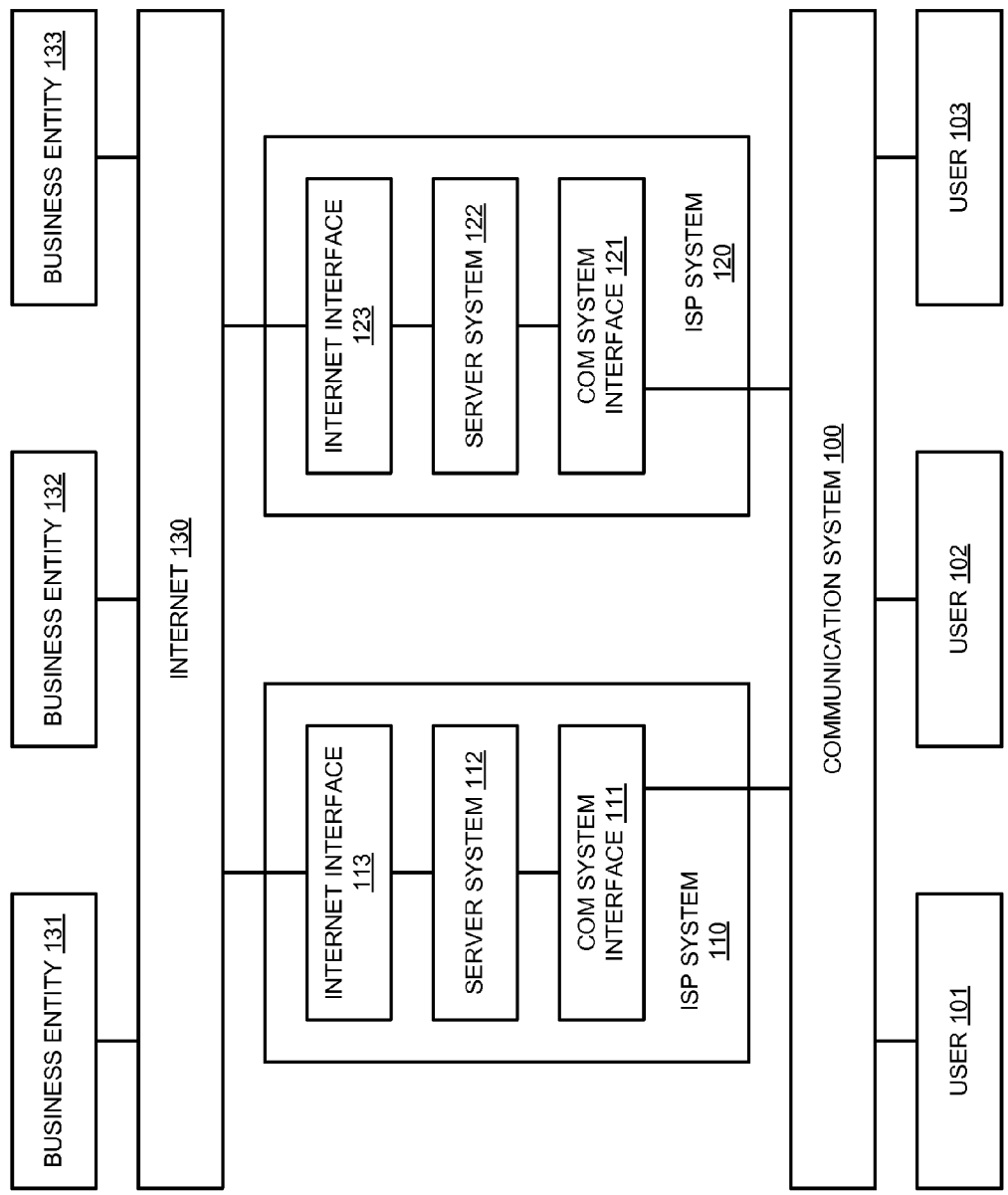
FIG. 1 illustrates an ISP system and its operating environment in an example of the invention.

FIG. 1 illustrates Internet Service Provider (ISP) system 110 and its operating environment in an example of the invention. ISP system 110 includes communication system interface 111, server system 112, and Internet interface 113. Server system 112 is coupled to communication system interface 111 and Internet interface 113. Communication system interface 111 is coupled to communication system 100. Internet interface 113 is coupled to Internet 130.

ISP system 120 could be a conventional ISP and could be a prepaid system. ISP system 120 includes communication system interface 121, server system 122, and Internet interface 123. Server system 122 is coupled to communication system interface 121 and Internet interface 123. Communication system interface 121 is coupled to communication system 100. Internet interface 123 is coupled to Internet 130.

Communication system 100 is coupled to users 101-103. Communication system 100 could be the Public Switched Telephone Network (PSTN) or some other type of communication system. Users 101-103 have the ability to communicate with communication system interfaces 111 and 121 over communication system 100. In some examples, users 101-103 direct computers to dial access telephone numbers to obtain telephone connections through communication system 100 from their computers to communication system interfaces 111 and 121.

Internet 130 is coupled to independent business entities 131-133. Internet 130 could be the well-known Internet or some other type of inter-networking system. Independent business entities 131-133 could include Internet web sites. In the context of the invention, two business entities are independent from one another if the business entities do not have a 50% or greater ownership interest in one another. Thus, independent business entities 131-133 have less than 50% ownership interests in each other, and typically, independent business entities 131-133 have no ownership interest in each other.

Communication system interface 111 could be any system configured to exchange communications with users 101-103 over communication system 100. Internet interface 113 could be any system configured to exchange communications with Internet 130. Communication system interface 111 and Internet interface 113 could be conventional like interfaces 121 and 123 of ISP system 120. Except for portions of its software, server system 112 could be conventional like server system 122 of ISP system 120. Based on this disclosure, those skilled in the art will appreciate how to modify existing computer and communications equipment and software to make and use ISP system 110.

Figure 2:
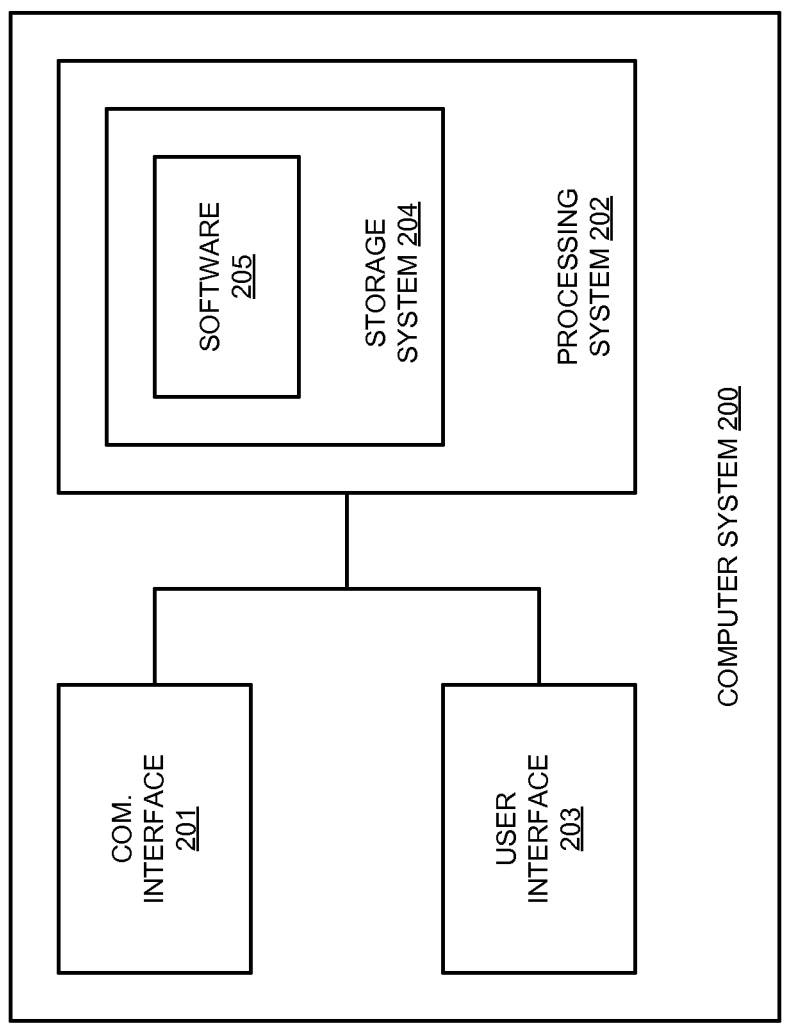
FIG. 2 illustrates a computer system for a server system in the ISP system in an example of the invention.

FIG. 2 illustrates computer system 200 for server system 112 in ISP system 110 in an example of the invention. Computer system 200 includes communication interface 201, processing system 202, and user interface 203. Processing system 202 includes storage system 204. Storage system 204 stores software 205. Processing system 202 is linked to communication interface 201 and user interface 203. Computer system 200 could be comprised of a set of networked and programmed general-purpose computers, although those skilled in the art will appreciate that programmable or special purpose circuitry and equipment may be used. Computer system 200 may use a client server architecture where operations are distributed among a server system and client devices that together comprise elements 201-205.

Communication interface 201 could comprise network interface cards, servers, switches, or some other communication devices. Communication interface 201 may be distributed among multiple communication devices. Processing system 202 could comprise computer microprocessors, logic circuits, or some other processing devices. Processing system 202 may be distributed among multiple processing devices. User interface 203 could comprise a keyboard, mouse, voice recognition interface, microphone and speakers, graphical display, touch screen, or some other type of user devices. User interface 203 may be distributed among multiple user devices. Storage system 204 could comprise disks, tapes, integrated circuits, servers, or some other memory devices. Storage system 204 may be distributed among multiple memory devices.

Processing system 202 retrieves and executes software 205 from storage system 204. Software 205 may comprise an operating system, utilities, drivers, networking software, and other software typically loaded onto computers in an ISP server system. Software 205 could also comprise an application program, firmware, or some other form of machine-readable processing instructions. When executed by processing system 202, software 205 directs processing system 202 to perform the operations described herein for server system 112.

Server system 112 stores a plurality of user identifiers in individual association with a plurality of independent business brands. Thus, each user identifier is associated with at least one independent business brand. A user identifier could be a user name, Personal Identification Number (PIN), password, e-mail address, domain name, telephone number, or some other code that identifies an individual user. A business brand is the logo, design, or symbol that identifies a business entity. In the context of the invention, two business brands are independent if they respectively relate to independent business entities. An example of an independent business brand is the Sprint red diamond logo.

Prior to obtaining prepaid Internet service from ISP system 110, users 101-102 obtain respective prepaid Internet accounts. Users 101-102 may transfer their own money for the accounts, or one of business entities 131-133 may pay for the prepaid Internet accounts. In some examples, users 101-102 purchase a compact disc from a retail location of one of business entities 131-133. The compact disc has software that users 101-102 load and execute to establish their prepaid Internet accounts. In some examples, users 101-102 use a credit card to purchase and download software from a web site of one of business entities 131-133 over Internet 130, ISP system 120, and communication system 100. In other examples, one of business entities 131-133 that paid for the prepaid Internet accounts may transfer software to users 101-102. Users 101-102 then execute the software to establish their prepaid Internet accounts. Other techniques to establish the prepaid accounts may be used in other examples.

Server system 112 stores the prepaid Internet accounts for users 101-102. Server system 112 decrements a user's prepaid account based on a service rate and an amount of Internet service provided to the user. A service rate is typically monetary amount per unit of time or data. Server system 112 decrements a prepaid account based on the service rate and either the time duration or the amount of data transferred for the prepaid Internet service session. If a user's prepaid account reaches zero, server system 112 terminates Internet service for that user—at least until the user or their sponsor refreshes their prepaid account with an additional money transfer or authorization.

In operation, server system 112 receives an Internet service request from user 101. The Internet service request includes the user identifier for user 101. One example of an Internet service request is a dial-up log-in over the PSTN using an access telephone number. Server system 112 processes the user identifier for user 101 to select at least two of the independent business brands. The selection is based on the individual association between the user identifier and the independent business brand. In some examples, one of the independent business brands is associated with all user identifiers, and the individual association is used to determine the other independent business brand. For example, the Sprint brand could be associated with all user identifiers and another independent business brand could be associated with a specific subset of the user identifiers.

In response to the Internet service request, server system 112 transfers a web page to user 101. The web page includes the two independent business brands selected for user 101. The web page could also include other information or Internet links for the business entities associated with the selected brands. Server system 112 receives a user input to the web page, and in response, provides prepaid Internet service to user 101. One example of a user input is a Universal Resource Locator (URL) for a web site that the user desires to visit. Server system 112 then decrements the prepaid account for user 101 in response to the Internet service provided to user 101.

Internet service includes access to Internet 130, but may also include additional services, such as e-mail, account refresh, instant messaging, frequently asked questions, and other features. All of these services could be conventional like those offered by ISP system 120. Note that the web pages generated by server system 112 for these additional services could be co-branded in a similar fashion to the first page which is typically the home page.

Server system 112 also receives an Internet service request from user 102. The Internet service request includes the user identifier for user 102. Server system 112 processes the user identifier for user 102 to select two of the independent business brands. Note that one or two of these brands may be different than the brands selected for user 101. In response to the Internet service request, server system 112 transfers a web page to user 102. The web page includes the two independent business brands selected for user 102. Server system 112 receives a user input to the web page, and in response, provides Internet service to user 102. Server system 112 then decrements the prepaid account for user 102 in response to the Internet service provided to user 102.

ISP System Co-Branding Ability and Advantages

In addition to the independent business brands, other information for the independent business entities may be retrieved and placed on the web page sent to the user. Advantageously, the independent business entities may present their own brands and information to specific prepaid Internet users based the user identification in the Internet service request. This capability allows multiple independent business entities to co-brand multiple prepaid Internet services on a per user basis.

In one example, an on-line business may desire to offer prepaid Internet service to their on-line customers. The on-line business may not want to develop and operate their own pre-paid ISP, and they may not want to pay the amount required to resell a service that only has their on-line brand, but that is provided by a prepaid ISP wholesaler. The on-line business can reduce their costs and operations by allowing a prepaid ISP to co-brand the prepaid Internet service. When a customer of the on-line business requests Internet service, the brands and information of both the prepaid ISP and the on-line business are presented on the web page to the customer. Advantageously, the prepaid ISP obtains revenue from the on-line business and also some brand equity. The on-line reduces their cost by allowing the co-branding. The on-line business also obtains a valuable communication channel to their customers whenever their customers use the co-branded prepaid Internet service. The on-line business may use this channels for various promotions, customer feedback, customer surveys, and to provide links to other selected web sites.

In another example, a prepaid ISP could partner with a first retailer to co-brand a first prepaid Internet Service. The prepaid ISP could also partner with a second retailer to co-brand a second prepaid Internet Service. The first and second retailers could then sell the software to establish the prepaid Internet accounts from their retail stores or from their web sites over the Internet. When a customer of the first retailer requests Internet service, the brands and information of both the prepaid ISP and the first retailer are presented on the web page to the customer. When a customer of the second retailer requests Internet service, the brands and information of the prepaid ISP and the second retailer are presented on the web page to the customer. Advantageously, the prepaid ISP obtains powerful retail partners to market their prepaid Internet service. Also, the retail partners obtain a valuable communication channel to their customers whenever their customers use the co-branded prepaid Internet service. The retailers may use these channels for various promotions, customer feedback, customer surveys, and to provide links to other selected web sites.

Advantageously, the prepaid ISP is not required to establish separate web sites or URLs for each retail partner. Because the co-branded web pages are dynamically generated for each user based on the user identifier in the Internet service request, the ISP system may co-brand various prepaid Internet services with multiple partners through the same web site and URL.

Web Page Sections, Displays, and Staging System

Figure 3:
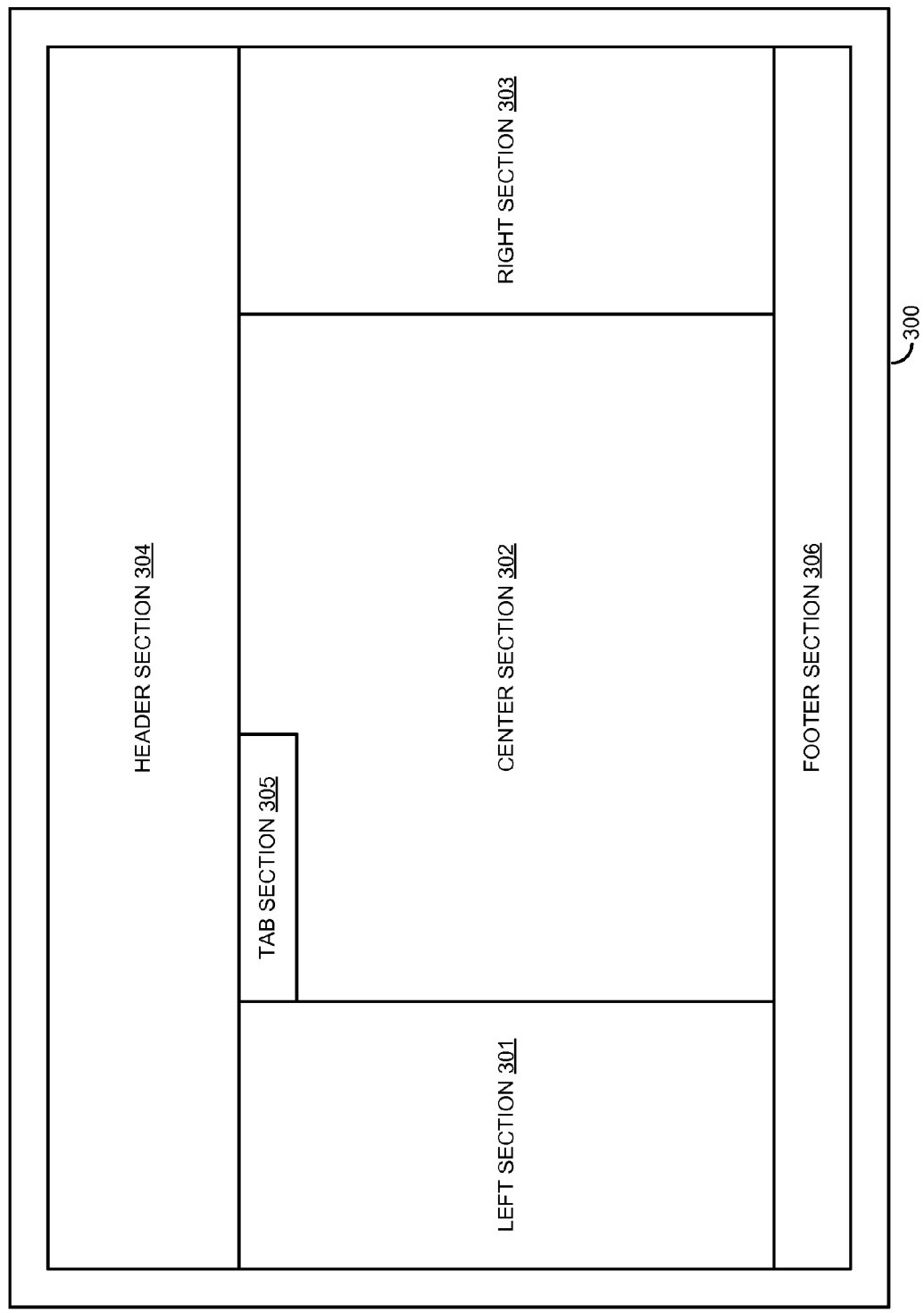
FIG. 3 illustrates a web page in an example of the invention.
Figure 4:
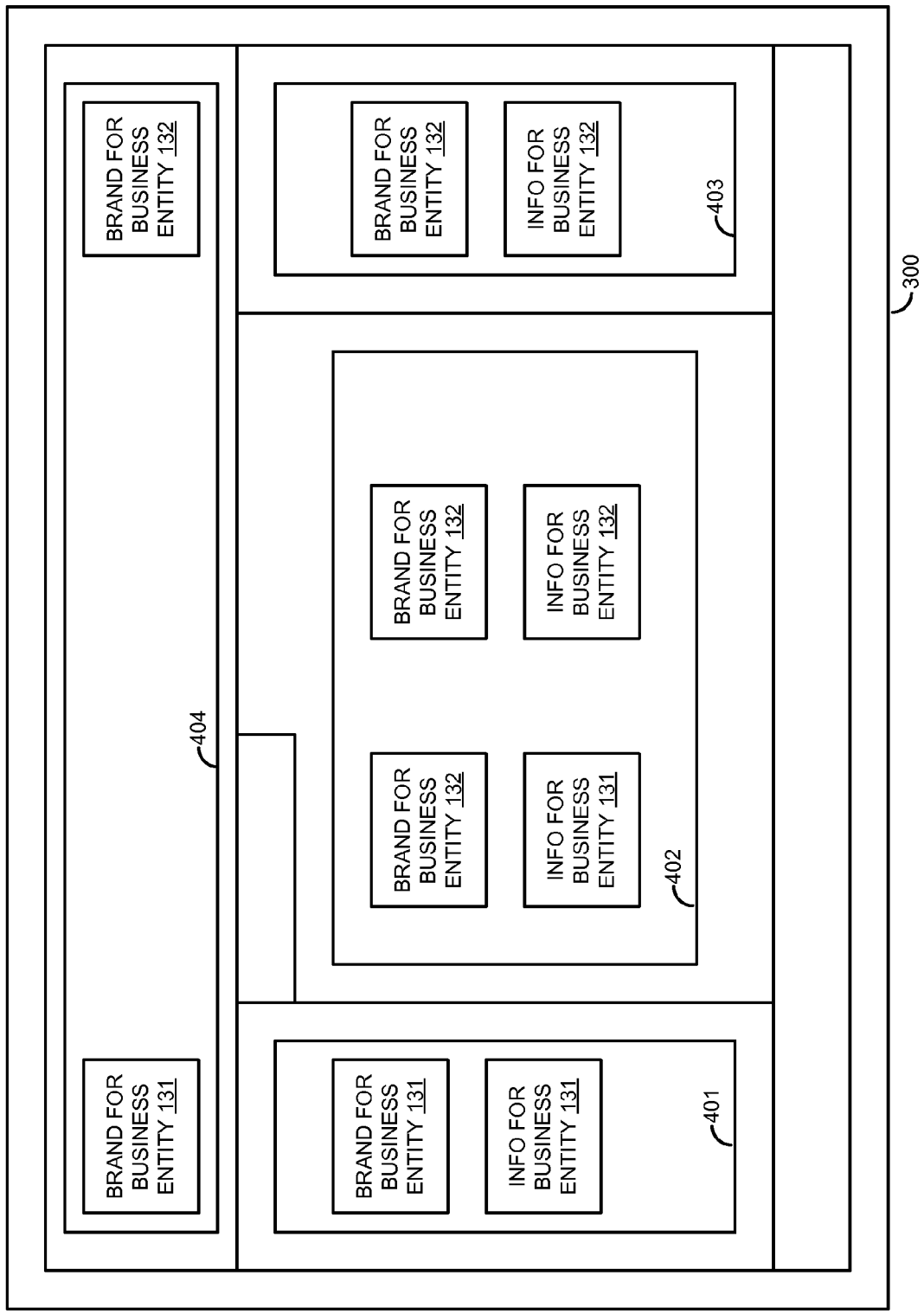
FIG. 4 illustrates a web page in an example of the invention.

FIGS. 3-4 illustrate web page 300 in an example of the invention. Web page 300 represents one of the co-branded pages sent to the user in response to the Internet service request. Referring to FIG. 3, web page 300 is comprised of left section 301, center section 302, right section 303, and header section 304, tab section 305, and footer section 306. If desired, gutters may be placed between sections 301-306.

Based on the user identifier in the Internet service request and the desired page, server system 112 retrieves various displays for sections 301-306 to generate web page 300. The displays contain the independent business brands and other information that is associated with the user identifier and the desired page. The following table illustrates a simplified and representative data structure that associates user identifiers, web pages, sections, and displays.

| USER ID | WEB PAGE | LEFT SECTION 301 | CENTER SECTION 302 | RIGHT SECTION 303 | HEADER SECTION 304 |
| --- | --- | --- | --- | --- | --- |
| USER 101 | HOME | DISPLAY 401 | DISPLAY 402 | DISPLAY 403 | DISPLAY 404 |
|  | REFRESH | DISPLAY 123 | DISPLAY 678 | DISPLAY 890 | DISPLAY 345 |
| USER 102 | HOME | DISPLAY 432 | DISPLAY 987 | DISPLAY 210 | DISPLAY 654 |
|  | E-MAIL | DISPLAY 432 | DISPLAY 765 | DISPLAY 109 | DISPLAY 654 |

Note that the table has been highly simplified and columns for menu tab section 305 and footer section 306 are omitted for brevity. Rows for additional web pages and users are also omitted for brevity. An example of a display is a HyperText Mark-up Language (HTML) file.

For a given user identifier and web page, server system 112 stores the displays for left section 301, center section 302, right section 303, and header section 304. After receiving the given user identifier and identifying the appropriate web page, server system 112 processes the data structure to select the displays for left section 301, center section 302, right section 303, and header section 304. Server system 112 then includes the selected displays in their corresponding sections of web page 300 for transfer to the user.

For clarity, the reference numbers and labels for sections 301-306 that are present on FIG. 3 are omitted on FIG. 4. FIG. 4 illustrates a home page for user 101 that server system 112 generates based on the above data structure. Based on the data structure, server system 112 respectively places displays 401-404 in sections 301-304. Display 401 in left section 301 includes the brand and additional information for independent business entity 131. Display 402 in center section 302 includes the brands and additional information for both independent business entities 131-132. Display 403 in right section 303 includes the brand and additional information for independent business entity 132. Display 404 in header section 304 includes both brands for independent business entities 131 and 132. Thus, the data structure provides a co-branding tool that can be used to co-brand web pages specifically for each user on a page-by-page and section-by-section basis.

Note that when different tabs are selected by a user from tab section 305, different center displays would be placed in center section 302—or in other sections if desired. Thus, the above data structure could be expanded to specify displays for each section of each tab.

Server system 112 could include a staging system to receive displays over Internet 130 from independent business entities 131-133—who are typically affiliated with the independent business brands. The staging system allows one business entity to submit proposed displays for web pages, and allows another business entity to review and approve the displays before using them for actual web pages.

For example, Sprint Communications may host a prepaid Internet service and co-brand the service with an on-line business. The on-line business could transfer displays to a Sprint staging system over the Internet. The staging system would allow Sprint to review and approve the displays submitted by the on-line business. Once approved, Sprint would store the displays for use with user identifiers associated with the on-line business. Advantageously, the staging system allows one co-brander to efficiently input their own brands and information for review and approval of the other co-brander. Thus, each co-brander can specify pertinent and timely displays for promotions and new products, but the other co-brander gets to review an approve the displays for accuracy, taste, and other parameters.

Additional System Features

Server system 112 decrements a prepaid account based on the service rate and the amount of prepaid Internet service that is provided. Server system 112 can store various service rates in association with various user identifiers. Server system 112 can select the service rate for a prepaid Internet service session based on the user identifier for the session. Thus, different service rates can apply on a per user basis. Numerous other factors can also be used to select the service rate.

Users 101-103 may use access telephone numbers to access ISP system 110 over communication system 100. There may be many such access telephone numbers including both local telephone numbers and toll-free telephone numbers. Server system 112 can store various service rates in association with various access telephone numbers. Server system 112 can select the service rate for the prepaid Internet service session based on the access telephone number for the session. Thus, different service rates can apply on a per access telephone number basis.

Server system 112 can select and include information in the web pages based on the access telephone number used for the session. For example, a business entity may have a local promotion in a local geographic area. This local geographic area could be associated with one or more of the access telephone numbers. When a user identifier that is associated with the business entity's brand is used along with an access telephone number that is associated with the local promotion, then server system 112 would include information for the local promotion in the web page. In addition to local promotions, the information placed on the web page based on the access telephone number could be related to weather, sports, news, and entertainment for the associated local geographic area. In the context of the invention, the term local geographic area means a city, metropolitan area, state, or group of up to ten contiguous counties.

Server system 112 can restrict the Internet service on a session to specific web sites based on the user identifier for the session. For example, a business entity may restrict their co-branded Internet service to a few selected web sites. When a user identification associated with the business entity's brand is used, server system 112 would restrict the Internet service provided to the user to the web sites selected by the business entity. In this fashion, a business entity may pay for the co-branded prepaid Internet account, but restrict the prepaid Internet service to its own selected web sites.

Server system 112 may provide access to a specific website to only a subset of the user identifiers. For example, a business entity may have a special web site not available to the general public, but may provide access to the special web site through their co-branded Internet service. When a user identification associated with the business entity's brand is used, server system 112 would provide the user with access to the special web site.

Server system 112 may provide an enhanced service based on the user identifiers. For example, a business entity may desire to provide a specific instant message service with their co-branded Internet service. When a user identification associated with the business entity's brand is used, server system 112 would provide the instant message service to the user.

Server system 112 may generate reports that are specific to a set of the user identifiers. For example, a business entity may desire various reports related to their co-branded Internet service. When user identifications associated with the business entity's brand are used, server system 112 tracks selected user activities and information to generate reports for the business entity. The reports could indicate refresh activities, access telephone numbers used, e-mail addresses used, Internet service time used, and/or user inputs to selected pages.

Server system 112 may apply user-specific preferences based on the user identifiers. For example, a user may select certain operational parameters as user preferences for their prepaid Internet service. When a user identification associated with the specific user preferences is used, server system 112 would apply the specific user preferences on the session.

User 103 may obtain software to establish a prepaid Internet account in various ways. User 103 could download the software from a web site of one of business entities 131-133. The download might occur over Internet 130, ISP system 120, and communication system 100. In some examples, the user identification for user 103 is already included in the software and has been associated with a prepaid Internet account. Upon initial registration with ISP system 120, server system 112 may transfer a cookie to user 103 for subsequent use in co-branding and security. When user 103 requests Internet service using the software, server system 112 validates the user identification in the request before providing a co-branded home page to user 103. If user 103 has used all of the money in the prepaid account, server system 112 will provide a co-branded refresh page to user 103 instead of the home page.

In some examples, server system 112 may re-direct a user to a web page other than the home page based on the user identification. In some examples, users may select their home page, and tabs for e-mail, refresh, etc. would be provided with the selected home page.

In some examples, server system 112 may select only one brand based on the user identification, and provide only that brand and related information on the appropriate pages. In this fashion, the invention could be adapted to provide multiple private label prepaid Internet services from the same web site or URL.

The invention claimed is:

1. A method of operating a server system to control a plurality of co-branded Internet services delivered over an Internet access network, wherein a first user purchases a first one of the co-branded Internet services from a first Internet service and a second user purchases a second one of the co-branded Internet services from a second Internet service, the method comprising:

in the server system, processing a Universal Resource Identifier (URI) from the first user to identify a network brand for the Internet access network and a first brand for the first Internet service based on the first user purchase of the first co-branded Internet service;

in the server system, generating a first web page for delivery to the first user including the network brand for the Internet access network and the first brand for the first Internet service;

in the server system, processing the URI from the second user to identify the network brand for the Internet access network and a second brand for the second Internet service based on the second user purchase of the second co-branded Internet service;

in the server system, generating a second web page for delivery to the second user including the network brand for the Internet access network and the second brand for the second Internet service;

in the server system, restricting web site access to the first user based on first information from the first Internet service and restricting web site access to the second user based on second information from the second Internet service.

2. The method of claim 1 wherein:
the URL from the first user and the URL from the second user comprise a same URL;
generating the first web page comprises generating the first web page based on a first user identifier from the first user; and
generating the second web page comprises generating the second web page based on a second user identifier from the second user.

3. The method of claim 1, wherein restricting web site access to the first user based on first information from the first Internet service comprises restricting individual web pages and restricting web site access to the second user based on second information from the second Internet service comprises restricting individual web pages.

4. The method of claim 1 wherein the co-branded Internet services comprise prepaid Internet services.

5. The method of claim 1 wherein the first brand comprises a first logo that identifies the first Internet service and the second brand comprises a second logo that identifies the second Internet service.

* * * * *